United States Patent [19]

Imai

[11] Patent Number: 5,199,012
[45] Date of Patent: Mar. 30, 1993

[54] APPARATUS FOR DETECTING POSITIONAL DEVIATION OF A MOVING STAGE IN A TWO-STAGE OPTICAL RECORDING/PRODUCING APPARATUS

[75] Inventor: Hitoshi Imai, Amagasaki, Japan

[73] Assignee: Mitsubishi Denki Kabushiki Kaisha, Japan

[21] Appl. No.: 690,682

[22] Filed: Apr. 24, 1991

[30] Foreign Application Priority Data

May 9, 1990 [JP] Japan .................................. 2-120779

[51] Int. Cl.$^5$ .............................................. G11B 7/13
[52] U.S. Cl. ............................... 369/44.41; 369/44.14; 369/44.28; 369/112
[58] Field of Search ............... 369/44.41, 44.23, 44.11, 369/47, 44.32, 44.14, 44.31, 44.28, 112, 54, 58

[56] References Cited

U.S. PATENT DOCUMENTS

| | | |
|---|---|---|
| 4,363,961 | 12/1982 | Okada et al. |
| 4,785,438 | 11/1988 | Mizunoe ........................... 369/44.23 |
| 4,815,058 | 3/1989 | Nakamura et al. .................. 369/112 |
| 4,841,507 | 6/1989 | Imai et al. ........................ 369/112 |
| 4,956,833 | 9/1990 | Kokado et al. ..................... 369/54 X |
| 5,016,234 | 5/1991 | Nakamura et al. ................. 369/44.14 |
| 5,018,124 | 5/1991 | Ogasawara et al. ................ 369/44.32 |

FOREIGN PATENT DOCUMENTS

0393885 10/1990 European Pat. Off.
62-95743 5/1987 Japan.

*Primary Examiner*—Aristotelis Psitos
*Assistant Examiner*—Mohammad Edun
*Attorney, Agent, or Firm*—Wolf, Greenfield & Sacks

[57] ABSTRACT

The optical recording/reproducing apparatus provided with a dividing optical element which divides a part of the light from a light source and projects the divided light to a moving stage on which an objective lens is mounted, a reflecting optical element which is mounted on the moving stage and reflects the projected light from the dividing optical element, and a photodetector which detects the reflected light from the reflecting optical element, wherein the deviation amount of the moving stage from a reference position is detected on the basis of output of the photodetector. Since the condition when the reflected light is incident upon the photodetector is changed in consequence to the positional deviation of the reflecting optical element as the moving stage is moved, the deviation amount of the moving stage is detected on the basis of the output of the photodetector. The deviation amount of the moving stage can be detected at all times, thereby achieving good tracking control.

24 Claims, 6 Drawing Sheets

APPARATUS FOR DETECTING POSITIONAL DEVIATION OF A MOVING STAGE IN A TWO-STAGE OPTICAL RECORDING/PRODUCING APPARATUS

BACKGROUND OF THE INVENTION

1. Field of the Invention

This invention generally relates to an optical recording/reproducing apparatus and more particularly, to an optical recording/reproducing apparatus having an optical head comprised of a fixed optical system and a moving optical system.

2. Description of Related Art

Figure 1:
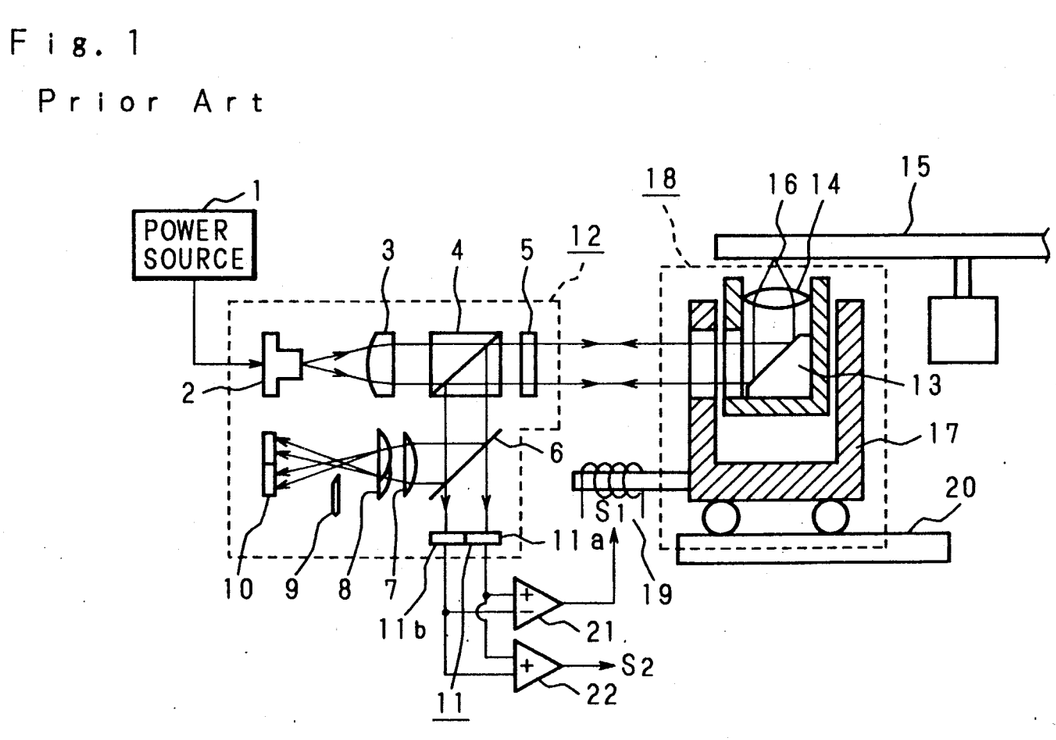
FIG. 1 shows the structure of a conventional optical recording/reproducing apparatus, particularly the mechanism of an optical head therein.

FIG. 1 shows the structure of a conventional optical recording/reproducing apparatus of the above-mentioned type disclosed, for example, in Japanese Patent Application Laid-Open No. 62-95743(1987), specifically of the mechanism of an optical head. In FIG. 1, reference 1 is a power source for driving the light of a semiconductor laser 2. There are provided, in the projecting direction of laser beam from the semiconductor laser 2, a collimator lens 3 for making the light scattering from the semiconductor laser 2 to be a parallel beam, a polarizing beam splitter 4 for passing the parallel beam therethrough and reflecting the light from a moving optical system 18 which will be described later (reflected light from a disk 15), and a ¼ wavelength plate 5. The light projected from the semiconductor laser 2 is, after being changed to a parallel beam by the collimator lens 3, projected to the moving optical system 18 through the polarizing beam splitter 4 and the ¼ wavelength plate 5.

A half prism 6 is provided in the vicinity of the polarizing beam splitter 4 to divide the light from the moving optical system 18 into two directions. At one side of the optical path divided by the half prism 6, there is arranged a focus-divergence detecting system consisting of a convex lens 7, a cylindrical lens 8, a knife edge 9 and a two-divided photodetector 10 having the light receiving face thereof divided into upper and lower two parts in the drawing. On the other hand, at the other side of the optical path, there is arranged a photodetector 11 having a light receiving face divided into right and left parts in the drawing and consisting of two photodetecting elements 11a, 11b.

The semiconductor laser 2, collimator lens 3, polarizing beam splitter 4, ¼ wavelength plate 5, half prism 6, convex lens 7, cylindrical lens 8, knife edge 9, two-divided photodetectors 10 and 11 are mounted on a fixed stage (not shown), thereby constituting a fixed optical system 12. Each photodetecting element 11a, 11b is connected to a differential amplifier 21 and a summing amplifier 22. The differential amplifier 21 determines the difference of outputs from the photodetecting elements 11a, 11b and generates a track-divergence detecting signal S1. On the other hand, the summing amplifier 22 determines the sum of outputs from the photodetecting elements 11a, 11b, and generates a data reproducing signal S2.

The moving optical system 18 comprises a mirror 13 which shifts the direction of the parallel beam from the fixed optical system 12 by 90°, an objective lens 14 which condenses the parallel beam to a condensed spot 16 on the disk 15, and a moving stage 17 to which the mirror 13 and the objective lens 14 are mounted. A pair of rails 20 are placed below the moving stage 17 in parallel with the parallel beam. The moving stage 17 is allowed to slide on the rail 20 by an electromagnetic driving device 19 using a voice coil, so that the moving stage 17 is moved in parallel to the parallel beam.

Now, the operation of the conventional optical recording/reproducing apparatus will be discussed hereinbelow.

Laser beams projected from the semiconductor laser 2 are changed to parallel beams, which pass as P-polarized light through the polarizing beam splitter 4, ¼ wavelength plate 5 and mirror 13 to the objective lens 14. Accordingly, the light is condensed to be a condensed spot 16 of approximately 1 μm diameter onto the disk 15. The light reflected from the disk 15 is returned through the objective lens 14 as a parallel beam, reflected by the mirror 13 and enters the ¼ wavelength plate 5. The reflected beam passing through the ¼ wavelength plate 5 is, on account of reciprocation through the plate 5, incident upon the polarizing beam splitter 4 as S-polarized light, reflected in a direction downwards in the drawing and guided to the half prism 6.

Then, the beam is divided into two directions by the half prism 6. One of the two is led to the focus-divergence detecting system consisting of the convex lens 7, cylindrical lens 8, knife edge 9 and photodetector 10. The detecting principle of the focus-divergence detecting system is not directly related to this invention, and therefore the detailed description thereof will be abbreviated here. In brief, an output from the photodetector 10 is converted to a focus-divergence detecting signal by an operational circuit (not shown), and the objective lens 14 is moved by an actuator (not shown) in a direction of an optical axis thereof, thereby controlling the condensed spot 16 so that it is always focused on the disk 15.

The other of the two of the beams divided by the half prism 6 is received by the photodetector 11, which is further converted to the track-divergence detecting signal S2 by the differential amplifier 21 thereby to control the driving current of the electromagnetic driving device 19. As a result, the moving stage 17 is moved in a radial direction of the disk 15 for control of tracking. The output from the photodetector 11 is also inputted to the summing amplifier 22, and the output from the summing amplifier 22 becomes the data reproducing signal S2.

Figure 2A:
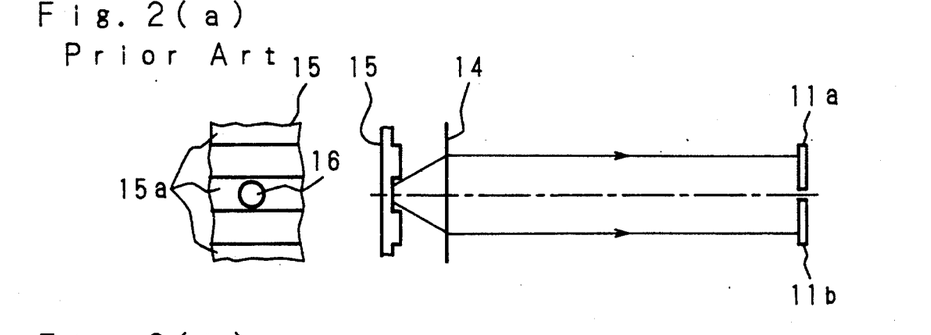
FIGS. 2a-2d are explanatory of the operation to detect the track-divergence.
Figure 2B:
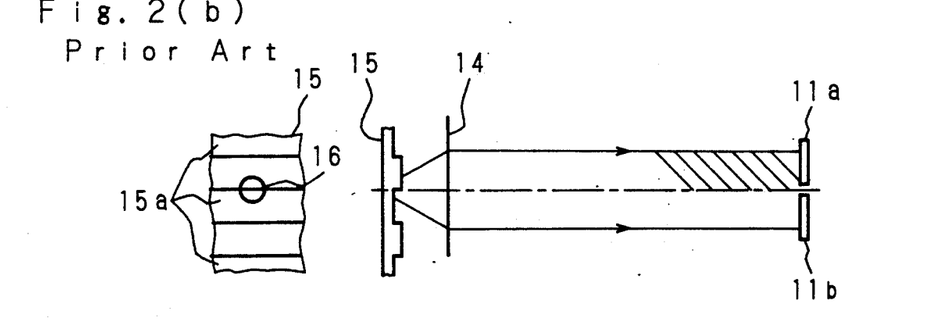
Figure 2C:
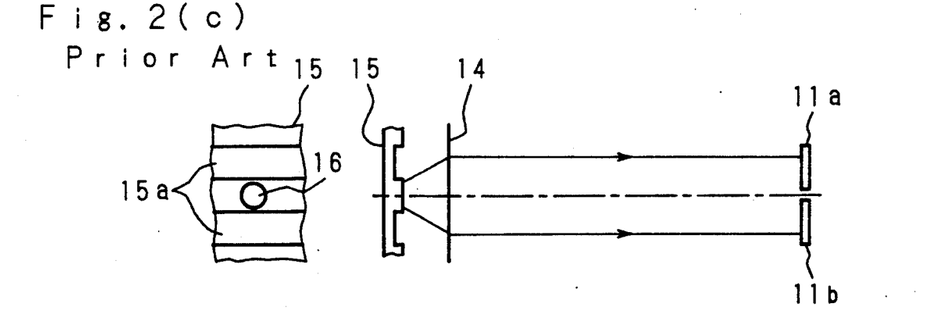
Figure 2D:
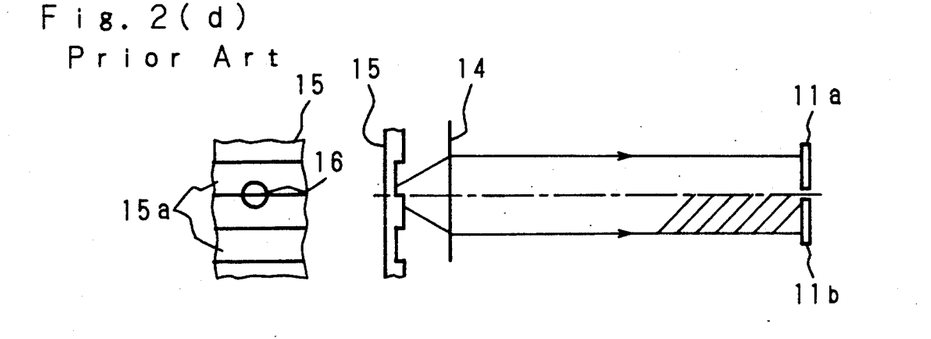

The detecting method of the track-divergence will be discussed more in detail with reference to FIG. 2. The left side of FIG. 2 is a plan view of a part of the disk 15, and the right side thereof illustrates the optical path of the optical head. As shown in FIGS. 2(a) or 2(c), when the condensed spot 16 is positioned at the center of a guide groove (track) 15a formed in the disk 15 or in the middle of the adjacent guide grooves 15a, the quantity of the light entering the photodetecting elements 11a, 11b is equal to each other. However, if the condensed spot 16 is shifted sideways as indicated in FIG. 2(b), the diffraction of the light due to the track 15a causes the difference in the quantity of the light incident upon the photodetecting element 11a (indicated by an inclined line in the drawing) from the light incident upon the photodetecting element 11b. That is, the quantity of the light incident upon the photodetecting element 11a becomes smaller than the latter. Further, if the condensed spot 16 is shifted to the opposite side as shown in FIG. 2(d), the quantity of the light incident upon the photodetecting element 11b (indicated by an inclined line in the drawing) is reduced as compared with that of the light incident upon the photodetecting element 11a.

Therefore, it becomes possible to detect by detecting the difference of outputs from the photodetecting elements 11a, 11b whether the condensed spot 16 matches to the track 15a, or where it is deviated to either side. This is the detecting method of tracking called the diffracted-light method (push-pull method).

The foregoing description applies to the case where the moving stage 17 and the rail 20 are manufactured with ideal accuracy and, the moving stage 17 is moved exactly along the completely parallel course to the parallel beam from the fixed optical system 12. However, if the moving stage 17 is deviated off the original course due to some inclination of the rail 20 or the like, for example, an offset is generated in the track-divergence detecting signal S1. The operation in this case will be explained below with reference to FIGS. 3 and 4.

Figure 3:
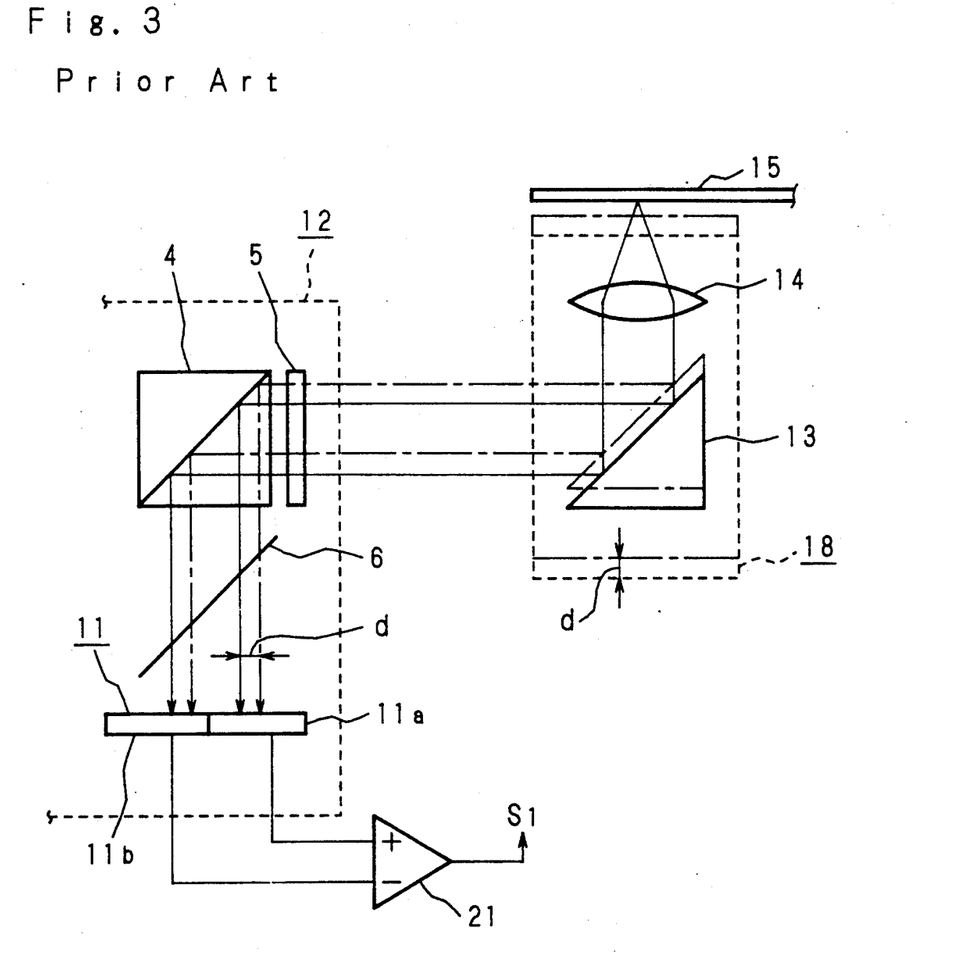
FIGS. 3 and 4a-4b are explanatory of the principle when an offset is generated in a track-divergence detecting signal.
Figure 4A:
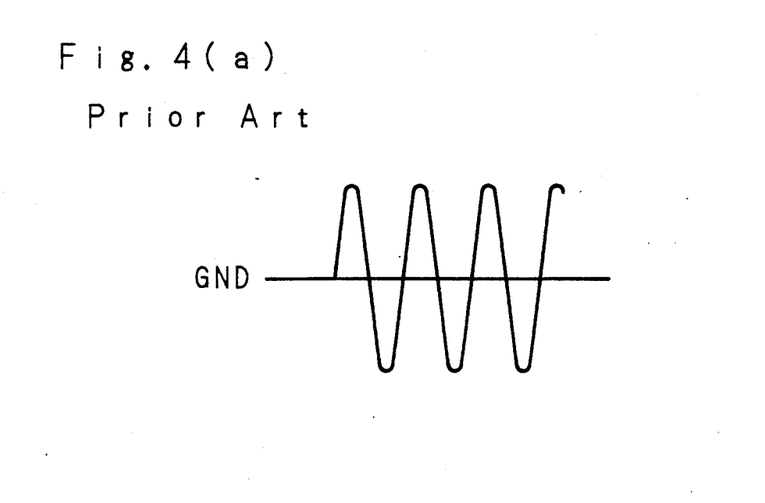
Figure 4B:
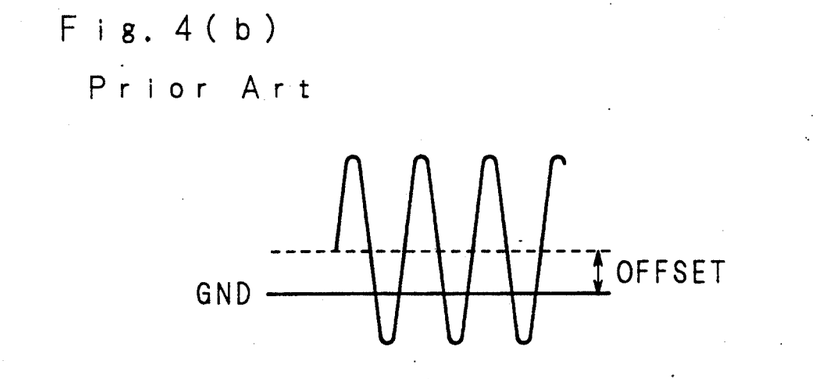

Referring first to FIG. 3, when the moving optical system 18 is at the initial position as shown by a broken line, the mirror 13 is positioned at the height indicated by a solid line. The reflected luminous flux shown also by the solid line is incident upon the photodetector 11 through the polarizing beam splitter 4 and the half prism 6. FIG. 4(a) shows the waveform of the track-divergence detecting signal S1 after the initial adjustment to make the off-set zero is carried out in the state of FIG. 3.

Subsequently, when the moving optical system 18 is moved on the rail 20 and displaced upwards by d from the initial position because of the inclination of the rail 20, etc. as indicated by a one-dot chain line in FIG. 3, the reflected beam from the disk 15 to the photodetector 11 represents a locus as shown by the one-dot chain line in the drawing. As a result, an offset is generated in the track-divergence detecting signal S1 (FIG. 4(b)).

As mentioned hereinabove, in the conventional optical recording/reproducing apparatus, if the moving stage of the apparatus is deviated from the originally-set moving course parallel to the parallel beam, an offset is observed in the track-divergence detecting signal. Accordingly, correct control of tracking cannot be achieved, worsening the recording/reproducing characteristic of the information.

SUMMARY OF THE INVENTION

This invention has been devised to solve the aforementioned disadvantages inherent in the prior art.

An object of this invention is to provide an optical recording/reproducing apparatus capable of detecting the amount of the deviation of a moving stage which deviation is a cause of an offset.

A further object of this invention is to provide an optical recording/reproducing apparatus capable of detecting the deviation amount of a moving stage to control tracking correctly, achieving good recording/reproducing characteristics of the information on a recording medium.

A still further object of this invention is to provide an optical recording/reproducing apparatus capable of monitoring the projecting power of a light source easily.

The optical recording/reproducing apparatus of this invention is provided with a light source, an objective lens which condenses the light from the light source onto a recording medium, first photodetecting means for detecting the light reflected by the recording medium through the objective lens, a moving stage on which the objective lens is mounted, projecting means for dividing the light from the light source to project towards the moving stage, reflecting means for reflecting the light divided by the projecting means, second photodetecting means for detecting the light reflected by the reflecting means, and means for determining the amount of deviations of the moving stage on the basis of the amount of the light detected by the second photodetecting means.

Since the condition when the reflected light enters the second photodetecting means is changed in consequence to the positional deviation of the reflecting means as the moving stage is shifted, the moving distance of the moving stage can be detected on the basis of the outputs from the second photodetecting means. More concretely, a photodetector is used as the second photodetecting means, the receiving surface of which is divided into two. Two photodetecting elements constituting the photodetector are positioned so that the difference of outputs therefrom is zero when the moving stage is at the normal position. Accordingly, the deviation amount (the moving distance) of the moving stage is detected corresponding to the difference of the outputs from the photodetecting elements.

Moreover, since the sum of the outputs from the photodetecting elements is proportional to the projecting power of the light source, this sum is utilizable as a monitoring signal of the projecting power of the light source. The first photodetecting means is provided for the purpose of tracking control, and an optical system for the purpose of focus control may further be provided.

The above and further objects and features of the invention more fully will be apparent from the following detailed description with accompanying drawings.

DESCRIPTION OF THE PREFERRED EMBODIMENTS

Figure 5:
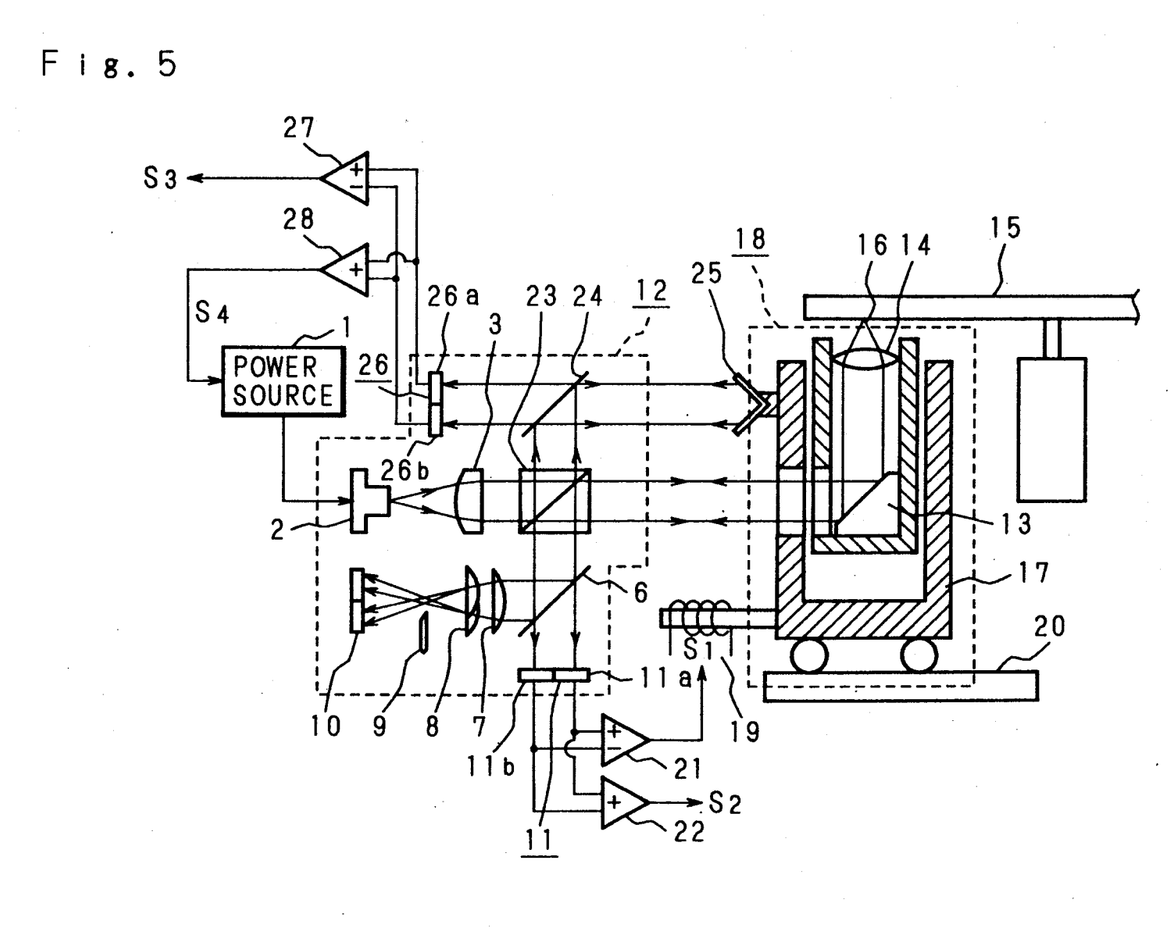
FIG. 5 shows the structure of an optical recording/reproducing apparatus according to this invention, particularly the mechanism of an optical head therein.

Referring to FIG. 5 showing an optical recording/reproducing apparatus according to a preferred embodiment of this invention, those designated by the same numerals as in FIG. 1 are the same or equivalent parts to in FIG. 1. Specifically, the power source 1 drives the light of the semiconductor laser 2 which is a light source. In the projecting direction of the semiconductor laser 2, there are provided the collimator lens 3, which makes the light scattering from the semiconductor laser 2 to a parallel beam, and a beam splitter 23 which splits the parallel beam and reflects the light from the moving optical system 18 which will be described later (the reflected light from the disk 15). In the structure shown in FIG. 5, the light projected from a semiconductor laser 2 is changed to a parallel beam by the collimator lens 3 and subsequently projected to the moving optical system 18 through the beam splitter 23.

In the vicinity of the beam splitter 23 is provided the half prism 6 which divides the light from the moving optical system 18 into two directions. A focus-divergence detecting system is provided on one optical path formed by the half prism 6, which is comprised of the convex lens 7, cylindrical lens 8, knife edge 9 and photodetector 10 having the light receiving surface thereof divided into two in the up-and-down direction in the drawing. Moreover, another photodetector 11 as a first photodetecting means is provided on the other optical path formed by the half prism 6. The photodetector 11 has its light receiving surface divided into two in the right-and-left direction in the drawing, and is comprised or two photodetecting elements 11a, 11b.

A half mirror 24 is placed in the vicinity of the beam splitter 23 to reflect the light split by the beam splitter 23 towards the moving optical system 18. This half mirror 24, along with the beam splitter 23, constitutes projecting means. The light reflected by the half mirror 24 advances in parallel with the parallel beam which passes from the beam splitter 23 to the moving optical system 18, and is projected to a corner cube 25 which is reflecting means mounted on the moving stage 17 and has orthogonal reflecting faces. The reflected light from the corner cube 25 enters a photodetector 26 through the half mirror 24. The photodetector 26, as second photodetecting means, has its light receiving surface divided into two in the up-and-down direction in the drawing, and is comprises of two photodetecting elements 26a, 26b.

The above-described semiconductor laser 2, collimator lens 3, half prism 6, convex lens 7, knife edge 8, photodetectors 10, 11, beam splitter 23, half mirror 24, and photodetector 26 are fixed to a fixed stage (not shown), thereby constituting the fixed optical system 12. Each photodetecting element 11a, 11b of the photodetector 11 is connected to the differential amplifier 21 and summing amplifier 22. The differential amplifier 21 operates the difference of outputs from the photodetecting elements 11a, 11b and outputs the track-divergence detecting signal S1 to the electromagnetic driving device 19, while the summing amplifier 22 operates the sum of outputs from the photodetecting elements 11a, 11b and outputs the data reproducing signal S2. Further, each photodetecting element 26a, 26b of the photodetector 26 is connected to a differential amplifier 27 and a summing amplifier 28 as detecting means. The former differential amplifier 27 operates the difference of outputs from the photodetecting elements 26a, 26b, generating a differential signal S3. On the other hand, the summing amplifier 28 operates the sum of outputs from the photodetecting elements 26a, 26b and generates a summing signal S4 to the power source 1.

The moving optical system 18 comprises the mirror 13 which shifts the parallel beam from the fixed optical system 12 by 90°, the objective lens 14 which condenses the parallel beam to the condensed spot 16 on the disk 15, and the moving stage 17 to which the mirror 13 and objective lens 14 are mounted. A pair of rails 20 below the moving stage 17 are set in parallel to the parallel beam. The moving stage 17 is driven along the rail 20 by the electromagnetic driving device 19 using a voice coil, that is, the moving stage 17 is moved in parallel to the parallel beam.

Figure 6A:
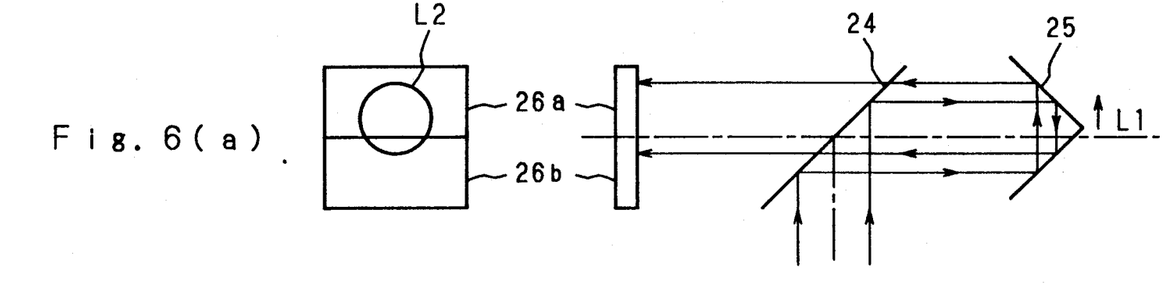
FIGS. 6a-6c are explanatory of the operation of the optical head of FIG. 5.
Figure 6B:
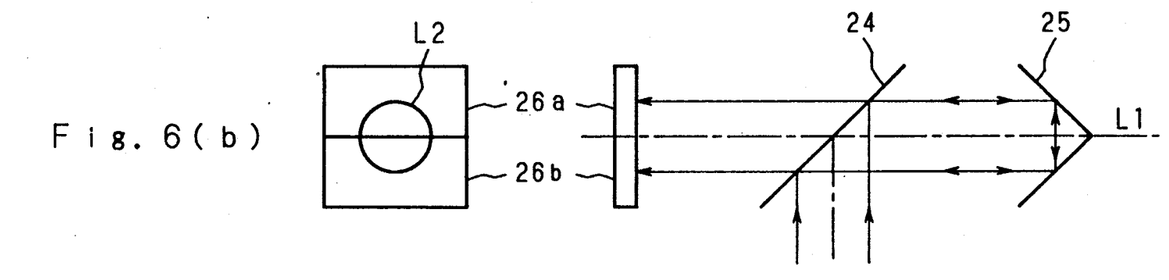
Figure 6C:
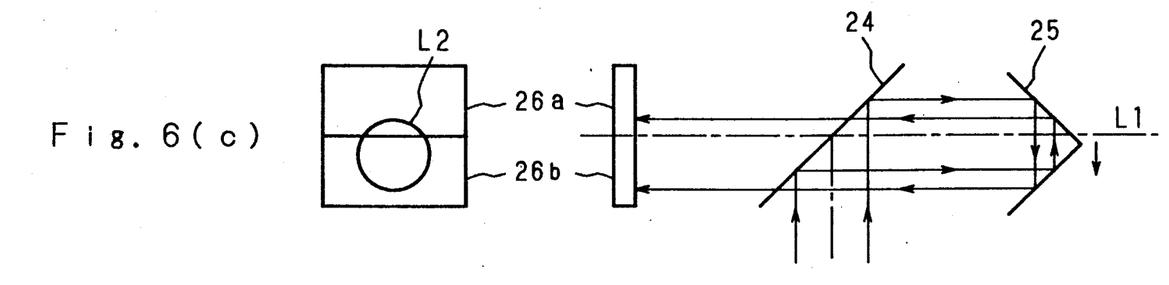

Hereinbelow, the operation of the optical recording/reproducing apparatus of this invention will be discussed. It is to be noted here, however, that the operation as the optical head is the same as in the conventional apparatus, accordingly with the description thereof being abbreviated, and the operation to detect the deviation of the moving stage 17 will be mainly discussed with reference to FIG. 6 as well.

FIG. 6 shows the change of the beam incident upon the photodetector 26 subsequent to the deviation of the moving stage 17. In FIG. 6, L1 represents an optical axis of the divided beam which is projected to the corner cube 25 in parallel to the parallel beam projected to the moving optical system 18 through the beam splitter 23 and half mirror 24. L2 indicates the reflected divided beam which passes through the half mirror 24 and is incident upon the photodetector 26 after the divided beam is reflected by the corner cube 25. The photodetector 26 is positioned so that the boundary line of the two photodetecting elements 26a, 26b thereof coincides with the optical axis L1.

FIG. 6(b) shows the case where the deviation amount of the moving stage 17 is zero. In this case, the center of the reflected divided beam L2 is on the boundary line of the photodetecting elements 26a, 26b, so that the light detecting amount of the photodetecting elements is equal to each other; and therefore the differential signal S3 from the differential amplifier 27 is zero. Meanwhile, FIG. 6(a) shows the case where the moving stage 17 is moved upwards due to, for example, the inclination of the rail 20 or the like. The reflected divided beam is moved upwards by the distance corresponding to the deviation amount of the moving stage 17, whereby the output from the photodetecting element 26a becomes larger than the output from the photodetecting element 26b, and the differential signal S3 is turned to a positive value. On the contrary, when the moving stage 17 is shifted downwards, as show in FIG. 6(c), the output from the photodetecting element 26b becomes larger than that from the photodetecting element 26a, and the differential signal S3 becomes a negative value.

As is discussed hereinabove, the deviation amount of the moving stage 17 can always be correctly detected on the basis of the differential signal S3 from the differential amplifier 27. Therefore, for example, if the inclination of the rail 20 or fixed optical system 12 is controlled so that the differential signal S3 is kept zero at all times, the offset of the track-divergence detecting signal S1 caused by the up-and-down movement of the moving optical system 18 is able to be solved.

It may be possible to feed a bias current for compensating the offset to the electromagnetic driving device 19 in addition to the original driving current for moving the moving optical system 18 to the designated position thereby to compensate the track-divergence. In such case, the bias current is controlled by the differential signal S3.

Back in FIG. 5, the summing signal S4 from the summing amplifier 28 is constant irrespective of the deviation of the moving stage 17. Therefore, the summing signal S4 is fed back to the power source 1 as a monitoring signal of the projecting power of the semiconductor laser 2, thus contributing to the stabilization of outputs from the semiconductor laser 2.

Although the inclination of the rail 20, etc. is controlled by the differential signal S3 in the foregoing embodiment, if it is expected that the rail 20, etc. is inclined due to dusts or the like adhered thereto, it may be possible to provide a driving mechanism to drive the moving stage 17 itself up and down and to control this driving mechanism for compensation of the offset.

Because of the above-discussed structure of the optical recording/reproducing apparatus, it is possible to always detect the deviation of the moving stage out of the course set in parallel to the parallel beam. Moreover, it is possible to monitor the projecting power of the light source on the basis of the outputs of the photodetector which has the light receiving surface thereof divided to receive the reflected divided beam.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An apparatus for recording and reproducing data on an optical recording medium, the apparatus having a fixed stage and a moving stage capable of moving in a tracking direction parallel with the recording medium, said apparatus comprising:

a light source attached to said fixed stage for providing a beam of light;

means attached to the fixed stage for dividing the light from the light source into first and second beams;

an objective lens mounted on said moving stage;

said means for dividing light directing said first beam towards the objective lens, said objective lens condensing said first beam onto the recording medium which reflects said condensed beam;

first photodetecting means attached to said fixed stage and positioned for detecting the light reflected from said recording medium through said objective lens;

means for determining an amount of track divergence on the basis of the amount of light detected by the first photodetecting means;

a reflector attached to said moving stage;

said means for dividing light directing said second beam at said reflector in a direction substantially parallel to the tracking direction, said reflector reflecting at least a portion of the second beam;

second photodetecting means attached to said fixed stage and positioned for detecting light reflected by said reflector; and means for determining an amount of deviation of said moving stage in a direction which is substantially orthogonal to the tracking direction on the basis of the amount of light detected by said second photodetecting means.

2. An apparatus as set forth in claim 1, further comprising:

a collimator lens for changing the light from said light source into a parallel beam and for projecting the parallel beam through said means for dividing; and wherein said tracking direction is parallel to said parallel beam.

3. An apparatus as set forth in claim 2, wherein said second photodetecting means has a light receiving surface comprising two photodetecting elements.

4. An apparatus as set forth in claim 3, wherein said two photodetecting elements are positioned so that the same amount of the light from said reflecting means is detected by each of said photodetecting elements when the deviation amount of said moving stage is zero. w 5. An apparatus as set forth in claim 1, wherein said means for determining an amount of deviation has means for calculating the difference of outputs from said two photodetecting elements, the difference corresponding to the deviation amount of said moving stage in the direction of deviation.

6. An apparatus as set forth in claim 3, further comprising means for calculating the sum of outputs from said two photodetecting elements so as to monitor the amount of the light from said light source.

7. An apparatus as set forth in claim 1, wherein said means for dividing comprises a beam splitter provided in an optical path between said light source and objective lens to divide the light from said light source into the first and second beams and, wherein said means for dividing includes a half mirror for directing the second beam.

8. An apparatus as set forth in claim 7, wherein said half mirror is provided in an optical path between said reflector and second photodetecting means so as to pass the reflected light from said reflector therethrough to be incident upon said second photodetecting means.

9. An apparatus as set forth in claim 1, wherein said reflector has at least two reflecting faces orthogonal to each other.

10. An apparatus as set forth in claim 9, wherein said reflector comprises a corner cube.

11. An apparatus as set forth in claim 1, wherein said first photodetecting means comprises first and second photodetecting elements.

12. An apparatus as set forth in claim 11, wherein the means for determining an amount of track divergence comprises subtracting means for calculating the difference of outputs from said first and second photodetecting elements of the first photodetecting means; and further comprising summing means for calculating the sum of outputs from said first and second photodetecting elements.

13. An apparatus as set forth in claim 1, further comprising focus-divergence detecting means for receiving the reflected light from said recording medium and detecting the focus-divergence on said recording medium.

14. An apparatus as set forth in claim 13, further comprising a beam splitter for dividing the reflected light from said recording medium and for projecting divided light to both said focus-divergence detecting means and said first photodetecting means.

15. An apparatus as set forth in claim 1 further comprising feedback means, responsive to said means for determining an amount of deviation, for controlling the position of said moving stage to maintain a substantially zero track divergence.

16. An apparatus as set forth in claim 15 wherein said feedback means provides a bias current for an electromagnetic driving device of the moving stage.

17. An apparatus as set forth in claim 15 wherein said feedback means includes means for driving the moving stage in a direction parallel to the direction of deviation to compensate for offset.

18. An apparatus for recording and reproducing data on an optical recording medium, the apparatus having a fixed stage and a moving stage capable of moving in a tracking direction parallel with the recording medium, said apparatus comprising:

a light source attached to said fixed stage for providing a beam of light;

means attached to said fixed stage for dividing said light into first and second beams and for directing said first beam onto the recording medium for reading information therefrom;

a reflector having two reflecting faces orthogonal to each other and attached to said moving stage;

said means for dividing light directing said second beam at said reflector in a direction parallel to the tracking direction;

means attached to the fixed stage and positioned for detecting light reflected by said reflector; and means for determining an amount of deviation of said moving stage in a direction which is substantially orthogonal to the tracking direction on the basis of the amounts of light detected by said detecting means.

19. An apparatus as set forth in claim 18, wherein said means for detecting light comprises two photodetecting elements.

20. An apparatus as set forth in claim 19, wherein said two photodetecting elements are positioned so that the same amount of light from said reflecting means is detected by each of said photodetecting elements when said deviation amount of said moving stage is zero.

21. An apparatus as set forth in claim 20, wherein said means for determining includes means for calculating the difference of outputs from said two photodetecting elements, said difference corresponding to the deviation amount of said moving stage.

22. An apparatus as set forth in claim 18, wherein said reflector comprises a corner cube.

23. An apparatus as set forth in claim 18 wherein said means for reading information on said recording medium includes means for moving said moving stage in a moving direction so as to maintain substantially zero track divergence.

24. An apparatus for recording and reproducing data on an optical recording medium, the apparatus having a fixed stage and a moving stage capable of moving in a tracking direction parallel with the recording medium, the apparatus comprising:

a light source attached to the fixed stage for providing a beam of light;

a beam splitter attached to the fixed stage for dividing said beam of light into first and second beams, said first beam being parallel to the tracking direction, said second beam being transverse to the tracking direction;

an objective lens attached to the moving stage for condensing a beam of light onto the recording medium for recording and reading information thereon, the beam of light reflecting from the recording medium and through the objective lens;

a mirror attached to the moving stage for directing the first beam towards the objective lens, and for directing light reflected from the recording medium toward the beam splitter;

a reflector attached to the moving stage having two reflective faces orthogonal to each other;

a half mirror attached to the fixed stage for directing the second beam in a direction parallel to the tracking direction towards the reflective faces of the reflector, said reflector reflecting said second beam towards said half mirror;

first and second photodetectors attached to said fixed stage each receiving an amount of light reflected by the reflector, the amount of light received by each photodetector changing as the moving stage moves in a direction substantially orthogonal to the tracking direction; and means for determining an amount of deviation of the moving stage on the basis of the amounts of light detected by the first and second photodetectors.

* * * * *